June 11, 1929.  J. STURGESS ET AL  1,716,870
SEALING RING
Filed Dec. 30, 1925
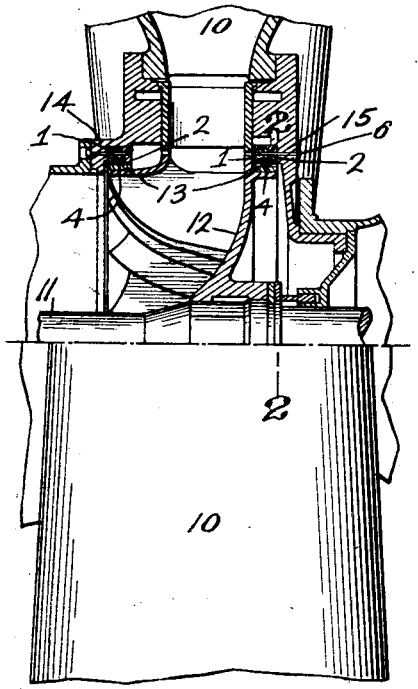
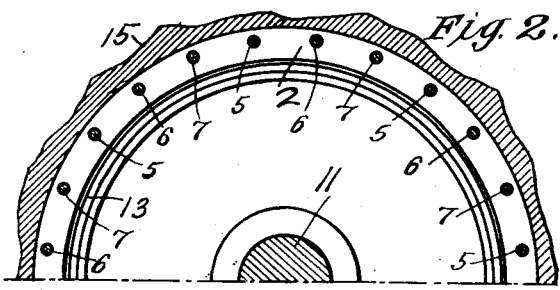
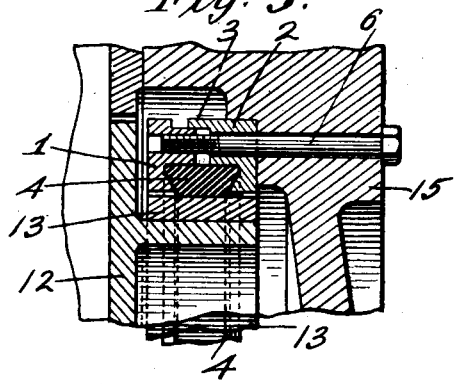
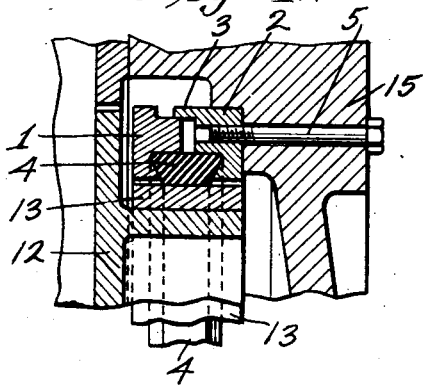
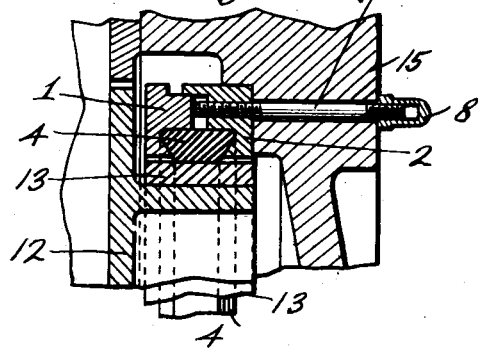
Inventor
John Sturgess and
Max Haeberlein
By their Attorneys Patented June 11, 1929.

1,716,870

UNITED STATES PATENT OFFICE.

JOHN STURGESS, OF GLENDALE, CALIFORNIA, AND MAX HAEBERLEIN, OF MAPLEWOOD, NEW JERSEY, ASSIGNORS TO WORTHINGTON PUMP AND MACHINERY CORPORATION, OF NEW YORK, N. Y., A CORPORATION OF VIRGINIA.

SEALING RING.

Application filed December 30, 1925. Serial No. 78,258.

This invention relates to improvements in sealing rings.

It is the especial object of the invention to provide an improved sealing ring which shall be simple in construction and efficient in operation, and which may be applied with advantage to liquid turbines in which it is desirable to maintain a close running fit between the wear ring carried by the turbine runner and the casing. In the preferred construction shown and described, the improved sealing ring consists of two cage members arranged to hold between them a ring of resilient material, such as soft rubber, with means accessible from the outside of the turbine casing arranged to co-operate with the cage members for holding the same in place and enabling ready adjustments thereof to be made for securing the necessary compression of the resilient member to cause it to bulge outward toward the wear ring on the turbine runner. The proper sealing may thus be continuously maintained independently of wear, without dismantling or interrupting the operation of the turbine. While the improved sealing ring has been shown as applied to a liquid turbine, it will be obvious that a similar construction may be applied with advantage to other types of apparatus, such, for example, as the butterfly valves commonly used to control the flow through large inlet and discharge pipes of water works and to centrifugal pumps and the like.
For a full understanding of the invention, a detailed description of a construction embodying the same in a preferred form as applied to a liquid turbine will now be given in connection with the accompanying drawings forming a part of this specification, and the features forming the invention will then be specifically pointed out in the claims.

In the drawings—

Figure 1 is an elevation of a portion of a horizontal turbine, partially in central section, showing the improved sealing ring applied thereto;

Figure 2 is a section on the line 2—2 of Fig. 1, and Figures 3, 4 and 5 are detail sections of the sealing ring and means for adjusting the parts.

Referring now to Fig. 1, 10 indicates the inlet volute of a liquid turbine, 11 the shaft, 12 the runner mounted thereon, 13 the usual metal wear ring on the runner, and 14, 15 front and rear cover plates.

Referring to Figs. 2 to 5, the improved sealing ring preferably is formed of two circular cage members 1, 2, the latter member being provided with an overhanging flange 3 arranged to engage the periphery of the member 1 for accurately positioning the members with respect to each other. Each of the members 1, 2 is provided with a groove, preferably and as shown of such shape that when the two members are brought into register, as shown, a groove of approximately dovetail form will be provided on the inner side of the ring. The sealing member 4, of some resilient material such as soft rubber and of a proper shape in cross section to seat in the groove is provided. The width of the member 4 should be such that when seated in the dovetail groove it will be firmly held even while the cage members are separated, and so as to provide for the necessary compression of the rubber ring which will force it further outward as the same becomes worn. The cage member 2 is secured to the cover plate 15 of the turbine by holding bolts 5 (Fig. 4) having threaded engagement with the cage member 2. To secure an even compression of the ring 4 and thus provide for efficient sealing between it and the metal wear ring 13, compression bolts 6 (Fig. 3) and bolts 7 (Fig. 5) for limiting the compression of the ring 4, are provided, the bolts 6 extending through holes in the cover plate 15 and cage member 2 and engaging threaded openings in cage member 1. The bolts 7 for limiting compression of the member 4 extend through holes in the cover plate 15 and cage member 2, the ends of such bolts being arranged to abut against the inner surface of the cage member 1, as shown, so as to limit the movement thereof toward the member 2, as the compression bolts are tightened. The limiting bolts 7, preferably and as shown, have threaded engagement with the cage member 2, a screw cap 8 being provided for such bolts 7, which takes against the outer surface of the cover plate 15. The holding bolts, and the limiting and compression bolts, preferably alternate with each other, and may be of any desired number.

From the foregoing it will be seen that wear of the sealing member 4 may be readily compensated for by adjusting the limiting bolts 7 so as to permit the compression bolts 6 to draw the cage member 1 toward the cage member 2. This results in further compression of the resilient member 4, causing it to bulge or project into the space between the turbine casing and the wear ring on the turbine runner, and thus compensate for wear of the resilient member 4. It will also be noted that all the adjustments above described may be readily made from the outside of the turbine casing and without any necessity for shutting down and partially dismantling the turbine in order to replace the sealing member 4, until the latter, after long use, has worn down to such an extent as to require renewal.

It will be understood that various changes in the construction and arrangement of parts shown and described may be made for use with a liquid turbine or other apparatus, while still retaining the invention defined by the claims.

What is claimed is:

1. The combination with a casing and a member rotatable therein, of a plurality of cage members within the casing, a resilient member projecting from between the cage members into contact with the rotatable member, means for securing one of the cage members to the casing, and a plurality of bolts passing through the casing and cooperating with the other cage member for securing the compression of the resilient member to thereby increase its projection from between the cage members and maintain a tight joint between the rotatable member and its casing.

2. The combination with a casing and a member rotatable therein, of a plurality of cage members within the casing, a resilient member projecting from between the cage members into contact with the rotatable member, means for securing one of the cage members to the casing, a plurality of bolts passing through the casing and cooperating with the other cage member for securing the compression of the resilient member to thereby increase its projection from between the cage members and maintain a tight joint between the rotatable member and its casing, and a plurality of bolts passing through the casing and cooperating with the movable cage member to limit the compression of the resilient member.

3. The combination with a casing and a member therein, of a plurality of cage members within the casing, a resilient member projecting from between the cage members into contact with the first-mentioned member, means for securing one of the cage members to the casing, and a plurality of bolts passing through the casing and the secured cage member and cooperating with the other cage member for securing the compression of the resilient member to maintain a tight joint between the first-mentioned member and its casing, said bolts being operable from the exterior of the casing.

4. The combination with a casing and a member therein, of a plurality of cage members within the casing, a resilient member projecting from between the cage members into contact with the first-mentioned member, means for securing one of the cage members to the casing, a plurality of bolts passing through the casing and the secured cage member and cooperating with the other cage member for securing the compression of the resilient member to maintain a tight joint between the first-mentioned member and its casing, and a plurality of bolts passing through the casing and threaded through the stationary cage member and extending into contact with the movable cage member to limit the compression of the resilient member, all of these bolts being operable from the exterior of the casing.

In testimony whereof we have hereunto set our hands.

JOHN STURGESS.
MAX HAEBERLEIN.